United States Patent
Chen et al.

(10) Patent No.: US 6,366,049 B1
(45) Date of Patent: Apr. 2, 2002

(54) MOTOR STARTER AND SPEED CONTROLLER SYSTEM

(75) Inventors: Li Chen; Richard Joseph Hampo, both of Livonia; Yifan Zhao, Bellevile, all of MI (US)

(73) Assignee: Ecostar Electric Drive Systems L.L.C., Dearborn, MI (US)

( * ) Notice: Subject to any disclaimer, the term of this patent is extended or adjusted under 35 U.S.C. 154(b) by 0 days.

(21) Appl. No.: 09/567,592

(22) Filed: May 10, 2000

(51) Int. Cl.[7] ................................................. H02P 5/28
(52) U.S. Cl. ...................... 318/799; 318/432; 318/433; 318/434; 318/727; 318/609; 318/610; 318/800; 318/801
(58) Field of Search .................. 318/432–434, 318/727, 800, 801, 799, 609–610

(56) References Cited

U.S. PATENT DOCUMENTS

| | | | | |
|---|---|---|---|---|
| 3,668,495 A | * | 6/1972 | Eisele et al. | 318/400 |
| 3,735,225 A | * | 5/1973 | Raatz | 318/332 |
| 3,950,684 A | * | 4/1976 | Peterson | 318/338 |
| 3,983,464 A | * | 9/1976 | Peterson | 318/327 |
| 4,539,514 A | * | 9/1985 | Espelage et al. | 318/778 |
| 4,634,951 A | | 1/1987 | Kampf et al. | |
| 4,683,412 A | * | 7/1987 | Bialek et al. | 318/798 |
| 5,206,575 A | * | 4/1993 | Nakamura et al. | 318/807 |
| 5,355,060 A | * | 10/1994 | Peterson | 318/432 |
| 5,426,354 A | * | 6/1995 | Bausch | 318/254 |
| 5,461,296 A | | 10/1995 | Messersmith et al. | |
| 5,461,531 A | * | 10/1995 | Tuchiya et al. | 361/28 |
| 5,561,358 A | * | 10/1996 | Kuwabara et al. | 318/799 |
| 5,659,235 A | * | 8/1997 | Yamada et al. | 318/808 |
| 5,701,066 A | * | 12/1997 | Matsuura et al. | 318/808 |
| 5,859,514 A | | 1/1999 | Chouffier et al. | |

* cited by examiner

Primary Examiner—Marlon T. Fletcher
Assistant Examiner—Tyrone Smith

(57) ABSTRACT

A speed controller circuit for a motor including a ramp function generator having a first input connected to a source of a speed demand signal and a second input connected to a ramp step signal. The ramp function generator develops a frequency ramp that has a slope is initiated by the speed demand signal which is adjusted in response to the ramp step signal. The ramp function generator also provides a frequency signal wherein the ramp function increases or decreases the frequency according to the speed demand. A V/F circuit to the ramp function generator and a space vector modulation circuit are connected to the V/F circuit. The output of the space vector modulation circuit is applied through power switching devices to the motor for speed control. A PI controller circuit is connected to a motor current feedback signal and to a maximum current signal, which provides the current limit of the control system. The output signal from the PI controller circuit is a ramp step signal used to adjust the ramp signal of the ramp function generator to provide to provide the best performance of the motor control system and achieve a better starting time for the motor.

8 Claims, 1 Drawing Sheet

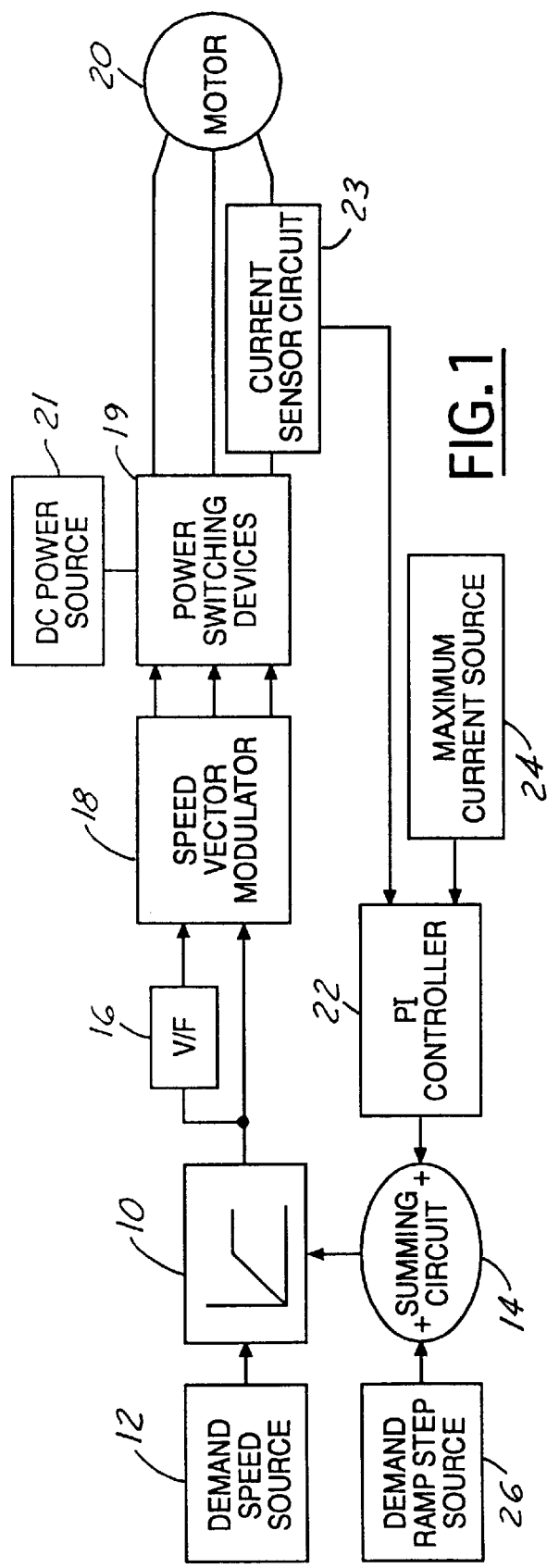
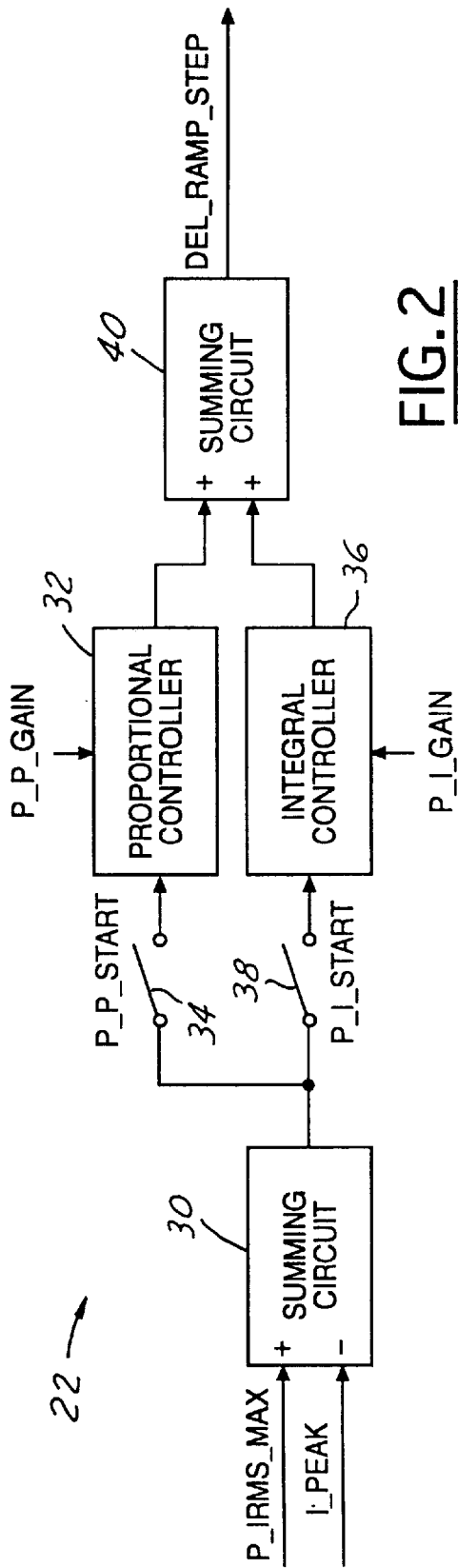

MOTOR STARTER AND SPEED CONTROLLER SYSTEM

BACKGROUND OF THE INVENTION

The present invention relates to circuits for starting and controlling the speed of a motor, and more particularly to a motor stating and speed controlling system including a technique for providing a ramp step for the system ramp function.

It is known that motor starting applications require that an induction motor or the like be started over a pre-selected period of time. It is desired that a limit be placed on the maximum current to be drawn by the motor during starting. In the motor control system referred to as an open loop voltage/frequency (V/F) control system, the frequency function and the voltage function control the motor speed, and more particularly the motor starting time and current that is drawn. For a given control device, the current is limited by the hardware.

Consequently, if the current of the motor can be maximized under the limit, a better starting time can be obtained. The ramp step of the current curve determines the motor current. If an optimum ramp step can be achieved, the maximized motor current can be obtained.

SUMMARY OF THE INVENTION

An object of the present invention is to provide an improved motor control system for a three-phase induction motor.

Another object of the present invention is to provide a motor control system including a motor starter and speed controller circuit wherein an induction motor speed is changed in accordance to a speed demand.

A further object of the present invention is to provide a motor control system wherein a ramp function is employed in a speed controller circuit to increase or decrease the frequency of an input signal to the motor in accordance with a speed demand.

Still another object of the present invention is to provide a motor control system wherein a PI (phase/current) controller is used in a speed controller circuit to control a ramp step applied to a ramp function to provide optimum performance of the motor control system.

BRIEF DESCRIPTION OF THE DRAWINGS

The above set forth objects and other features of the invention are made more apparent in the ensuing detailed description of the invention when read in conjunction with the attached drawings, wherein:

FIG. 1 is a schematic block diagram of an embodiment of a speed controller circuit according to the principles of the present invention.

FIG. 2 is a schematic block diagram of an embodiment of a PI controller used in the speed controller circuit embodiment illustrated in FIG. 1.

DETAILED DESCRIPTION

Referring to FIG. 1, a schematic illustration of a speed controller circuit is shown including a ramp function generator 10 having a first input connected to a source of a speed demand signal 12. Ramp function generator 10 has a second input connected to a ramp step signal from a summing circuit 14.

Ramp function generator 10 develops a voltage ramp that has a characteristic slope that is initiated by the speed demand signal from source 12 and which is adjusted in response to a ramp step signal from summing circuit 14. The ramp function generator 10 also provides a frequency signal wherein the ramp function increases or decreases the frequency according to the speed demand. The ramp function is used to control the pace of motor speed, which is dominated by the frequency of the voltage. When the demand speed is higher than the present speed, the frequency is increased by a ramp step until reaching the demand speed. When the demand speed is lower than the present speed the frequency is decreased by the ramp step until reaching the demanding speed.

During the starting of motor 20, the motor control system accelerates the speed by increasing the frequency and voltage signals to the motor 20. During the stopping of motor 20, the motor control system decelerates the speed by reducing the frequency and voltage signals to the motor 20.

A voltage/frequency (V/F) circuit means 16 is responsive to the ramp function signal from ramp function generator 10 and provides a voltage signal that, along with a frequency signal from ramp function generator 10, is applied to a space vector modulation circuit 18. The space vector modulation circuit 18 is a pulse width modulator circuit that determines a desired voltage value and position. The output of the space vector modulation circuit 18 is representative of and provides three pulse width modulated voltage waveforms and phase information related to the voltage waveforms. The outputs of space vector modulation circuit 18 is connected to power saving switching devices 19 which is also connected to a DC power supply circuit 21. The pulse width modulated signal from circuit 18 control power switching devices 19 to supply power motor 20. Motor 20 typically includes a plurality of stator windings energized by the input current signals.

A phase-current (PI) controller circuit 22 is connected to a current sensor circuit 23 which is located between switching devices 19 and motor 20 wherein a motor current feedback signal is applied as an input to PI controller circuit 22. The PI controller circuit 22 is also connected to a source of maximum current signal 24 that provides the current limit of the control system, which is limited by hardware. The output signal from PI controller circuit 22 is a ramp step signal. When the feedback current signal from motor 20 is greater than the maximum current signal from source 24, the ramp step output signal from PI controller circuit 22 is reduced. When the feedback current signal from motor 20 is less than the maximum current signal from source 24, the ramp step output signal from PI controller circuit 22 is increased.

The ramp step output signal from phase-current (PI) controller circuit 22 is connected to summing circuit 14 where it is summed with a default ramp step signal from source 26, wherein the default ramp step signal is a particular assigned value of ramp signal which is modified by the ramp step output signal from phase-current (PI) controller circuit 22. As previously stated, the resultant ramp step output signal from summing circuit 14 is applied to ramp function generator 10. Thus, the output signal from PI controller circuit 22 is used to control the ramp step and thus adjust the ramp signal of ramp function generator 10 to provide the best performance of the motor control system and achieve a better starting time for the motor 20.

FIG. 2 is a schematic illustration of a PI controller circuit 22 that may be employed in the motor controller system shown in FIG. 1.

In the circuit of FIG. 2, the rate of change of speed determines the motor current during starting. The output signal (del_ramp_step) of the PI controller controls the pace of speed according to the phase current feedback signal. When the feedback current is higher than the maximum current, the ramp step is reduced. If the feedback current is less than the maximum current limit, the PI controller circuit will increase the ramp step. Thus the maximum current (p_irms_max from source 24 in FIG. 1) and the feedback current (I_peak from current sensor device 23 in FIG. 1) are applied as input signals and compared in summing circuit 30 of PI controller 22.

As is known by those skilled in the art, a motor has a rush current at the very beginning of starting when the PI controller such as controller 22 is disabled. After the motor current is stabilized (i.e., the constant p_P_start condition), the proportional controller 32 is enabled first via switch 34 and then followed by the integral controller 36 via switch 38 at the p_I_start state.

For optimum performance of the PI controller, two clamp-on functions (p_I_hi, p_I_low, and p_PI_hi, p_PI_low) are applied. The first clamp-on function is applied after the integral functions at the output of the integral controller and the second clamp-on function is applied after the final output signal at the output of summing circuit 40

What has been described is an improved system for controlling the starting and speed of a motor wherein the output signal from a PI controller circuit is used to control a ramp step that is employed to adjust the ramp signal of a ramp function generator to provide the best performance of the motor control system and achieve a better starting time for the motor 20.

While the invention has been described in connection with a preferred embodiment, it is not intended to limit the scope of the invention to the particular form set forth, but on the contrary, it is intended to cover such alternatives, modifications and equivalents as may be included within the spirit and scope of the invention as described in the appended claims.

What is claimed is:

1. A speed controller system for an electrical motor comprising:
   an electrical motor;
   a source of a speed demand signal;
   a current sensor circuit connected to the electrical motor to provide a motor current signal;
   a phase/current (PI) controller circuit connected to the current sensor circuit and responsive to the motor current signal for providing a ramp step signal;
   a ramp function generator circuit having a first input connected to the source of a speed demand signal and a second input connected to the output of the phase/current (PI) controller circuit, the ramp function generator providing a speed ramp having slope initiated by the speed demand signal and which is adjusted in response to a ramp step signal from the phase/current (PI) controller circuit, the ramp function generator also providing a frequency signal wherein the ramp function increases or decreases the frequency according to the speed demand.

2. The speed controller system of claim 1 further comprising a voltage/frequency (V/F) circuit connected to the output of the ramp function generator and responsive to the ramp function signal for providing a voltage signal.

3. The speed controller system of claim 2 further comprising a space vector modulation circuit for providing pulse width modulation signals connected to the voltage signal from the voltage/frequency (V/F) circuit and the frequency signal from the ramp function generator to provide an output speed control signal representative of current waveforms and phase information related to the voltage waveforms; and power switching devices having inputs connected to a power supply circuit and to the output speed control signal from the space vector modulation circuit and having outputs connected to the electrical motor to provide motor speed control signals to the electrical motor.

4. The speed controller system of claim 3 further comprising a current sensor circuit connected between the power switching devices and the motor; and a feedback connection between the current sensor circuit and an input to the phase/current (PI) controller circuit for applying a motor current feedback signal to the PI controller circuit.

5. A speed controller system for an electrical motor comprising:
   an electrical motor;
   a source of a speed demand signal;
   a current sensor circuit connected to the electrical motor to provide a motor current signal;
   a phase/current (PI) controller circuit connected to the current sensor circuit and responsive to the motor current signal for providing a ramp step signal;
   a ramp function generator circuit having a first input connected to the source of a speed demand signal and a second input connected to the output of the phase/current (PI) controller circuit, the ramp function generator providing a speed ramp having slope initiated by the speed demand signal and which is adjusted in response to a ramp step signal from the phase/current (PI) controller circuit, the ramp function generator also providing a frequency signal wherein the ramp function increases or decreases the frequency according to the speed demand;
   a voltage/frequency (V/F) circuit connected to the output of the ramp function generator and responsive to the ramp function signal for providing a voltage signal;
   a space vector modulation circuit for providing pulse width modulation signals connected to the voltage signal from the voltage/frequency (V/F) circuit and the frequency signal from the ramp function generator to provide an output speed control signal representative of current waveforms and phase information related to the voltage waveforms;
   power switching devices having inputs connected to a power supply circuit and to the output speed control signal from the space vector modulation circuit and having outputs connected to the electrical motor to provide motor speed control signals to the electrical motor;
   a current sensor circuit connected between the power switching devices and the motor; a feedback connection between the current sensor circuit and an input to the phase/current (PI) controller circuit for applying a motor current feedback signal to the PI controller circuit; and
   a source of maximum current signal wherein an input to the phase/current (PI) controller circuit is also connected to the source of maximum current signal to provide a ramp step output signal representative of whether the motor current feedback signal is greater or less than the maximum current signal.

6. The speed controller system of claim 5 further comprising a summing circuit and a source of default ramp step signal, the summing circuit being connected to the output signal from the source of default ramp step signal and to the ramp step output signal from the phase/current (PI) controller circuit for summing the default ramp step signal and the ramp step output signal from the phase/current (PI) controller circuit for providing the ramp step signal to adjust the ramp function generator circuit.

7. The speed controller system of claim 6 wherein the PI controller circuit provides a reduced ramp step output signal when the feedback current signal from the motor is greater than the maximum current signal, and an increased ramp step output signal when the feedback current signal from the motor is less than the maximum current signal.

8. The speed controller system of claim 7 wherein the motor is a three-phase induction motor including a plurality of stator windings energized by the output signals from the power switching devices.

* * * * *